(12) United States Patent
Takeoka et al.

(10) Patent No.: US 8,559,161 B2
(45) Date of Patent: Oct. 15, 2013

(54) METALLIZED FILM CAPACITOR AND CASE MOLD TYPE CAPACITOR INCLUDING SAME

(75) Inventors: Hiroki Takeoka, Nara (JP); Hiroshi Kubota, Toyama (JP); Yukikazu Ohchi, Osaka (JP); Hiroshi Fujii, Toyama (JP); Yukihiro Shimasaki, Hyogo (JP)

(73) Assignee: Panasonic Corporation, Osaka (JP)

( * ) Notice: Subject to any disclaimer, the term of this patent is extended or adjusted under 35 U.S.C. 154(b) by 2763 days.

(21) Appl. No.: 13/505,303

(22) PCT Filed: Oct. 29, 2010

(86) PCT No.: PCT/JP2010/006391
§ 371 (c)(1),
(2), (4) Date: May 1, 2012

(87) PCT Pub. No.: WO2011/055517
PCT Pub. Date: May 12, 2011

(65) Prior Publication Data
US 2012/0218679 A1    Aug. 30, 2012

(30) Foreign Application Priority Data

Nov. 4, 2009 (JP) ............................. 2009-252599
Mar. 11, 2010 (JP) ............................. 2010-053984

(51) Int. Cl.
*H01G 4/005* (2006.01)
(52) U.S. Cl.
USPC ........... 361/303; 361/305; 361/311; 361/313; 361/321.1; 361/301.3

(58) Field of Classification Search
USPC .......... 361/303, 305, 311, 313, 301, 3, 301.5, 361/321.1, 321.2, 306.1, 272–273
See application file for complete search history.

(56) References Cited

U.S. PATENT DOCUMENTS

| | | | |
|---|---|---|---|
| 4,305,111 A | 12/1981 | Förster | |
| 5,019,418 A | 5/1991 | Linzey | |
| 5,608,600 A * | 3/1997 | Lavene | 361/303 |
| 5,737,179 A * | 4/1998 | Shaw et al. | 361/301.5 |
| 5,905,628 A * | 5/1999 | Okuno et al. | 361/303 |
| 6,370,008 B1 * | 4/2002 | Vetter | 361/273 |
| 6,631,068 B1 * | 10/2003 | Lobo | 361/273 |
| 7,027,286 B2 * | 4/2006 | Shiota et al. | 361/303 |
| 8,451,579 B2 * | 5/2013 | Takeoka et al. | 361/272 |
| 2006/0050467 A1 | 3/2006 | Shiota | |

FOREIGN PATENT DOCUMENTS

| | | |
|---|---|---|
| JP | 55105319 A | 8/1980 |
| JP | 61208821 A | 9/1986 |
| JP | 62279619 A | 12/1987 |
| JP | 158852 B2 | 12/1989 |
| JP | 07050219 A | 2/1995 |

(Continued)

OTHER PUBLICATIONS

International Application Serial No. PCT/JP2010/006391, International Search Report mailed Jan. 25, 2011, 2 pgs.

*Primary Examiner* — Nguyen T Ha
(74) *Attorney, Agent, or Firm* — RatnerPrestia

(57) ABSTRACT

A metallized film capacitor includes a dielectric film and two metal vapor-deposition electrodes facing each other across the dielectric film. At least one of the metal vapor-deposition electrodes is made of substantially only aluminum and magnesium. This metallized film capacitor has superior leak current characteristics and moisture resistant performances, and can be used for forming a case mold type capacitor with a small size.

12 Claims, 13 Drawing Sheets

(56) References Cited

FOREIGN PATENT DOCUMENTS

| | | | |
|---|---|---|---|
| JP | 09326328 | A | 12/1997 |
| JP | 2003338425 | A | 11/2003 |
| JP | 2004134561 | A | 4/2004 |
| JP | 2006269727 | A | 10/2006 |
| JP | 2009049139 | A | 3/2009 |

* cited by examiner

FIG. 3

| Concentration of Magnesium (wt.%) | Changing Rate of Capacitance |
|---|---|
| 0 | -35% |
| 0.5 | -25% |
| 5 | -3% |
| 15 | -5% |
| 25 | -20% |
| 45 | -30% |

| Concentration of Magnesium (wt.%) | Changing Rate of Capacitance ||||
|---|---|---|---|---|
| | Example 1 (Entire) | Example 2 (Region R13) | Example 3 (Region R12) | Example 4 (Region R11) |
| 0 | -35% | | | |
| 0.5 | -25% | -21% | -13% | -8% |
| 2 | -10% | -9% | -5% | -2% |
| 5 | -3% | -3% | -1% | -1% |
| 15 | -5% | -5% | -2% | -1% |
| 25 | -20% | -19% | -17% | -15% |
| 45 | -30% | -33% | -36% | -34% |

| Concentration of Magnesium (wt.%) | Changing Rate of Capacitance ||||
|---|---|---|---|---|
| | Example 5 (Entire) | Example 6 (Region 21) | Example 7 (Region R22) | Example 8 (Region R23) |
| 0 | -35% | | | |
| 0.5 | -28% | -25% | -18% | -14% |
| 2 | -15% | -14% | -10% | -8% |
| 5 | -6% | -5% | -3% | -2% |
| 15 | -8% | -7% | -4% | -3% |
| 25 | -25% | -24% | -22% | -21% |
| 45 | -35% | -33% | -32% | -31% |

| Concentration of Magnesium (wt.%) | Changing Rate of Capacitance | |
|---|---|---|
| | Comparative Example | Example 9 |
| 2 | -10% | -9% |
| 5 | -3% | -2% |
| 15 | -5% | -4% |
| 25 | -20% | -15% |
| 45 | -30% | -25% |

US 8,559,161 B2

METALLIZED FILM CAPACITOR AND CASE MOLD TYPE CAPACITOR INCLUDING SAME

THIS APPLICATION IS A U.S. NATIONAL PHASE APPLICATION OF PCT INTERNATIONAL APPLICATION PCT/JP2010/006391.

TECHNICAL FIELD

The invention relates to a metallized film capacitor that is used for various electronic devices, electric equipment, industrial equipment, and automobiles, and especially, suitable for smoothing, filtering or snubbering a motor driving inverter of hybrid automobiles, and to a case mold type capacitor including the metallized film capacitor.

BACKGROUND ART

In recent years, various kinds of electric equipment are controlled by an inverter circuit in view of environment protection, to save energy and achieve high efficiency. In particular, an automobile industry is introducing to market a hybrid electric vehicle (hereinafter, referred to as "HEV") which is driven by an electric motor and an engine; thus, technique which is benign to earth environment and realizing energy saving and high efficiency is actively developed.

A working voltage of an electric motor for such an HEV is high, e.g., several hundreds volts. Due to the high voltage, a metallized film capacitor having electric properties, such as a high withstanding voltage and a low loss, is getting an attention as a capacitor to be used for the electric motor. A maintenance-free product is a recent demand in the market, hence allowing the metallized film capacitor having an extremely long life to be remarkably used.

In general, such metallized film capacitors are mainly classified into a structure in which a metal foil is used as its electrode and another structure in which a vapor-deposition electrode formed on a dielectric film is used as its electrode. In the case of the metallized film capacitor using a metal vapor-deposition electrode that is an electrode made of vapor-deposited metal, the volume occupied by the electrode can be reduced more than an electrode made of a metal foil so that a light-weight device having a small size can be achieved. In such a metal vapor-deposition electrode, in the event of occurrence of short-circuit at a defective insulation portion, a portion on the periphery of the defective portion is evaporated and scattered by energy of the short-circuit to have an insulating property. Thus, the metal vapor-deposition electrode has a self-recovering function for recovering the functions as a capacitor. Since the self-recovering function provides high reliability against insulation breakdown, the metal vapor-deposition electrode has been widely used.

FIG. 12 is a cross-sectional view of conventional metallized film capacitor 501 described in Patent Literature 1. FIG. 13 is a plan view of metallized films 502 and 503 used in metallized film capacitor 501.

Metallized film 502 includes dielectric film 33A made of, e.g., a polypropylene film and metal vapor-deposition electrode 31A provided on a surface of dielectric film 33A. Metal vapor-deposition electrode 31A is formed on one surface of dielectric film 33A by vapor-depositing aluminum except for insulating margin 34A on one end of dielectric film 33A. Metallized film 503 includes dielectric film 33B made of, e.g., a polypropylene film and metal vapor-deposition electrode 31B formed on one surface of dielectric film 33B. Metal vapor-deposition electrode 31B is formed on one surface of dielectric film 33B by vapor-depositing aluminum thereon except for insulating margin 34B on one end of dielectric film 33B. Metallized films 502 and 503 are stacked and rolled. Sprayed-metal electrodes 36A and 36B are formed on both end surfaces of rolled metallized films 502 and 503. Metal vapor-deposition electrodes 31A and 31B are connected to sprayed-metal electrodes 36A and 36B and drawn out, respectively.

Portions of metal vapor-deposition electrodes 31A and 31B facing across dielectric film 33A constitute an effective electrode portion forming a capacitance. The effective electrode portion has width W in a direction in which sprayed-metal electrodes 36A and 36B are arranged. Metal vapor-deposition electrode 31A is divided by slits 35A into plural divided electrode portions 32A within on the side from the center of width W of the effective electrode portion toward insulating margin 34B. Metal vapor-deposition electrode 31B is divided by slits 35B into plural divided electrode portions 32B on the side from the center of width W of the effective electrode portion toward insulating margin 34A. Slits 35A and 35B are formed by oil transferred onto dielectric films 33A and 33B. Metal deposition electrodes are not formed at slits 35A and 35B on dielectric films 33A and 33B.

Metal vapor-deposition electrode 31A is located on a side closer to sprayed-metal electrode 36A opposite to insulating margin 34A from the center of width W of the effective electrode portion, and is formed on the entire portion on one surface of dielectric film 33A. Metal vapor-deposition electrode 31B is located on a side closer to sprayed-metal electrode 36B opposite to insulating margin 34B from the center of width W of the effective electrode portion, and is formed on the entire portion on one surface of dielectric film 33B. Plural divided electrode portions 32A are connected to metal vapor-deposition electrode 31A with plural fuses 37A in parallel with one another, respectively. Plural divided electrode portions 32B are connected to metal vapor-deposition electrode 31B with plural fuses 37B in parallel with one another, respectively.

Metallized films 502 and 503 are stacked on each other and rolled by plural turns. Melting zinc is sprayed on both end surfaces of rolled metallized films 502 and 503 to form sprayed-metal electrodes 36A and 36B, thus providing metallized film capacitor 501.

Metallized film capacitor 501 has a self-protective function so that little amount of heat generation is caused by fuses 37A and 37B. A current flowing into portions of metal vapor-deposition electrodes 31A and 31B as being closer to sprayed-metal electrodes 36A and 36B, and the current is smaller as being farther from sprayed-metal electrodes 36A and 36B. Metal vapor-deposition electrodes 31A and 31B that are closer to sprayed-metal electrodes 36A and 36B than divided electrode portions 32A and 32B are have larger areas. Therefore, metal vapor-deposition electrodes 31A and 31B have smaller resistance so that large heat is not generated even when a large current flows. A smaller current flows into divided electrode portions 32A and 32B that are farther from sprayed-metal electrodes 36A and 36B than metal vapor-deposition electrodes 31A and 31B are. Therefore, currents flowing through fuses 37A and 37B are smaller so that heat generated by fuses 37A and 37B can be reduced to consequently suppress a temperature rise.

In the case that metallized film capacitor 501 is used in an HEV, there are strong demands for, e.g., a high voltage resistance to applied voltage, a large electric current application, and a large capacitance. Therefore, plural metallized film capacitors 501 are connected in parallel with one another with bus bars. A case mold type capacitor including plural metallized film capacitors 501 accommodated in a case and a molding resin filling the case has been developed and put into practical use.

FIG. 14A is a cross-sectional plan view of conventional case mold type capacitor 504 described in Patent Literature 2. FIG. 14B is a cross-sectional view of case mold type capacitor 504 on line 14B-14B shown in FIG. 14A. Case mold type capacitor 504 includes case 41 made of a resin and plural capacitor elements 42 accommodated in case 41. Each capacitor element 42 is, for example, metallized film capacitor 501 shown in FIGS. 12 and 13. Connecting members 43A and 43B are unitarily coupled to each other. Connecting member 43A is accommodated in case 41 while connecting member 43B is externally drawn from case 41. Molding resin 44 filling case 41 fixedly secures capacitor elements 42, and is made of an insulating resin, such as an epoxy resin. Case mold type capacitor 504 further includes electrode unit 45 and mounting leg 46 for use in externally attaching case mold type capacitor 504. Molding resin 44 is injected into case 41 from injecting surface 47.

Connecting member 43A is connected to electrode unit 45 of each capacitor element 42. By coupling connecting member 43B that is unitarily coupled to connecting member 43A to an external apparatus, electrode unit is electrically connected to the external apparatus. Case 41 accommodating the entire capacitor elements 42 and connecting member 43A therein is filled with molding resin 44 so that the entire capacitor elements 42 and connecting member 43A are secured. Injecting surface 47 is an opening surface of case 41 before the filling of molding resin 44. By injecting molding resin 44 from the opening surface, injecting surface 47 is formed. Connecting member 43B is externally drawn out from injecting surface 47, and directed outside of case 41.

Conventional case mold type capacitor 504 suppresses inductance without increasing the entire height.

In the case that case mold type capacitor 504 is used for a hybrid automobile, in particular, a high moisture resistant performance is required in addition to small-size and light weight as well as low costs. Upon application under the high-temperature and high-humidity environment, a leak current in metallized film capacitor 501 serving as capacitor element 42 becomes greater, and the capacitor performances tend to be subsequently lowered. Therefore, countermeasures, such as an increase of the amount of molding resin 44 of case mold type capacitor 504, are required, with the result preventing a small-size and a light weight as well as low costs.

CITATION LIST

Patent Literature

Patent Literature 1: Japanese Patent Laid-Open Publication No.2004-134561
Patent Literature 2: Japanese Patent Laid-Open Publication No.2003-338425

SUMMARY OF THE INVENTION

A metallized film capacitor includes a dielectric film and two metal vapor-deposition electrodes facing each other across the dielectric film. At least one of the metal vapor-deposition electrodes is made of substantially only aluminum and magnesium.

This metallized film capacitor has superior leak current characteristics and moisture resistant performances, and can be used for forming a case mold type capacitor with a small size.

BRIEF DESCRIPTION OF DRAWINGS

FIG. 3 shows results of high-temperature and high-humidity current-carrying tests of the metallized film capacitor in accordance with the embodiment.

DETAIL DESCRIPTION OF PREFERRED EMBODIMENT

Figure 1:
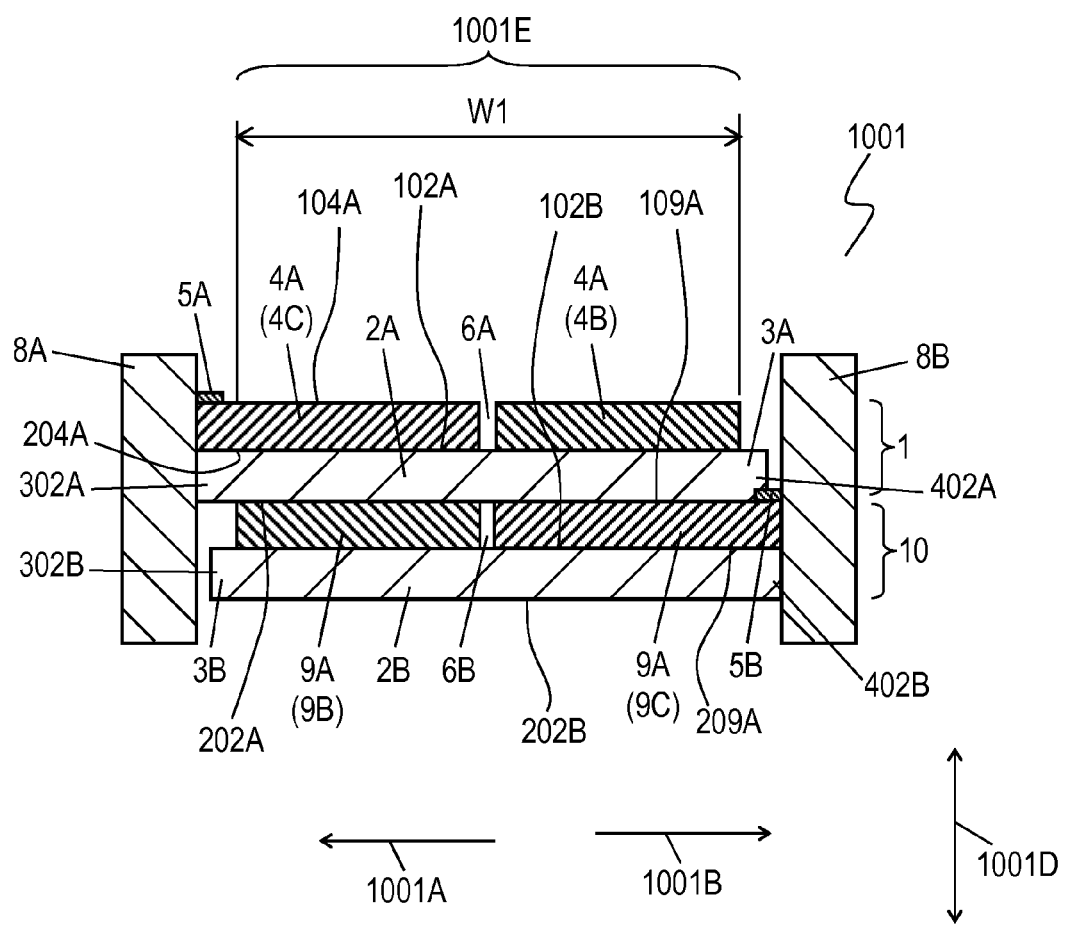
FIG. 1 is a cross-sectional view of a metallized film capacitor in accordance with an exemplary embodiment of the present invention.
Figure 2:
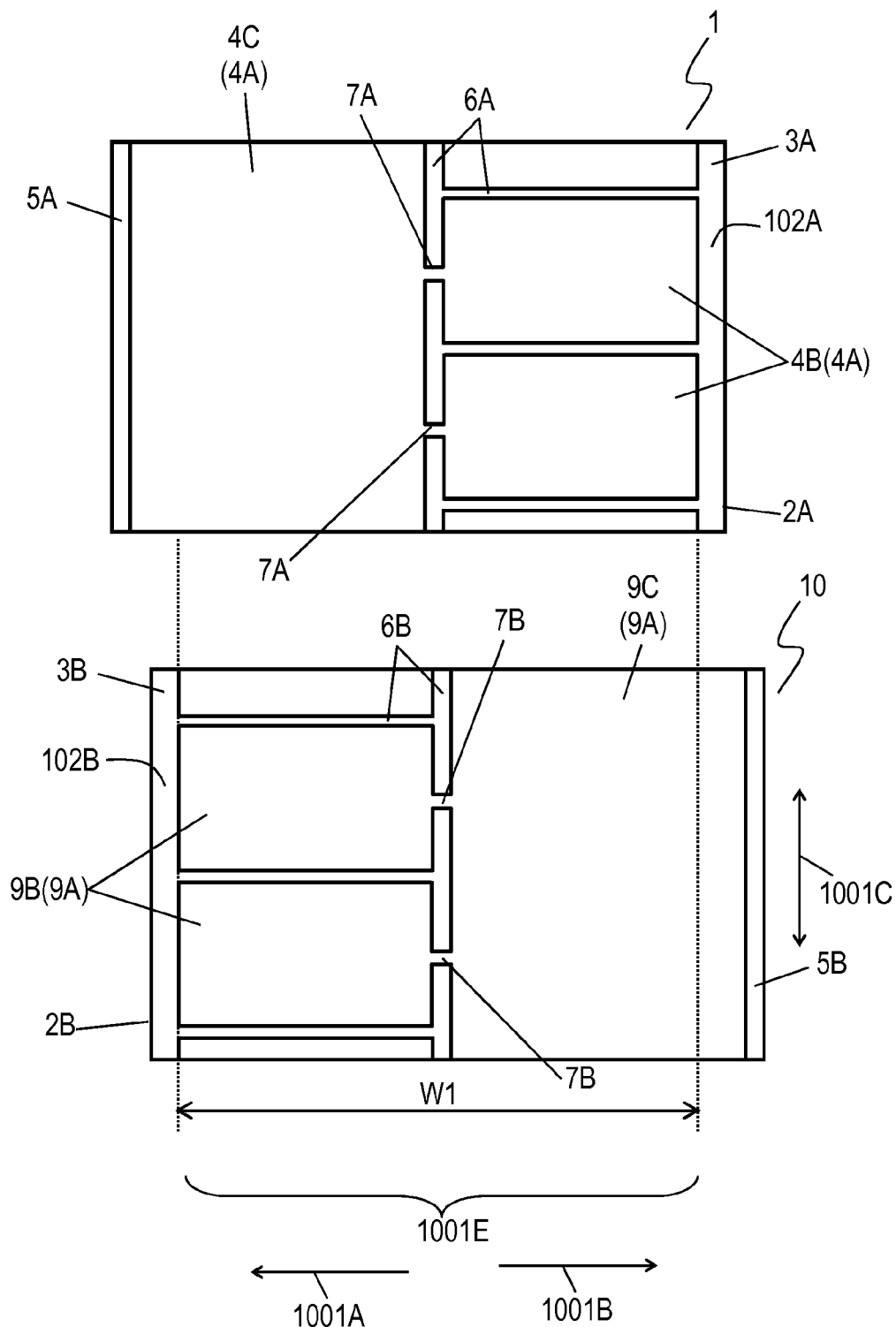
FIG. 2 is a plan view of a metallized film for the metallized film capacitor in accordance with the embodiment.

FIG. 1 is a cross-sectional view of metallized film capacitor 1001 in accordance with an exemplary embodiment of the present invention. FIG. 2 is a plan view of metallized films 1 and 10 to be used for metallized film capacitor 1001. For example, metallized film 1 is a metallized film for a positive electrode, and metallized film 10 is a metallized film for a negative electrode. Metallized films 1 and 10 are stacked on each other, and rolled by plural turns, thereby providing metallized film capacitor 1001.

Metallized film 1 includes dielectric film 2A, metal vapor-deposition electrode 4A formed on upper surface 102A of dielectric film 2A, and low resistance portion 5A formed on upper surface 104A of metal vapor-deposition electrode 4A. Dielectric film 2A has end 302A in direction 1001A and end 402A in direction 1001B opposite to direction 1001A. Lower surface 204A of metal vapor-deposition electrode 4A is situated on upper surface 102A of dielectric film 2A. Insulating margin 3A is formed on end 402A. Metal vapor-deposition electrode 4A is formed on upper surface 102A of dielectric film 2A so as to expose a portion of insulating margin 3A of upper surface 102A. Low resistance portion 5A made of a conductor is located on end 302A so as to have a low resistance by making the electrode thicker. Metal vapor-deposition electrode 4A and low resistance portion 5A are connected to electrode 8A, such as a sprayed-metal electrode, formed on end 302A, and drawn externally.

Metallized film 10 includes dielectric film 2B, metal vapor-deposition electrode 9A provided on upper surface 102B of dielectric film 2B, and low resistance portion 5B provided on upper surface 109A of metal vapor-deposition electrode 9A. Dielectric film 2B has end 302B in direction 1001A and end 402B in direction 1001B opposite to direction 1001A. Lower surface 209A of metal vapor-deposition electrode 9A is situated on upper surface 102B of dielectric film 2B. Insulating margin 3B is formed on end 302B. Metal vapor-deposition electrode 9A is provided on upper surface 102B of dielectric film 2B so as to expose a portion of insulating margin 3B of upper surface 102B. Low resistance portion 5B made of a conductor is located on end 402B so as to have a low resistance by making the electrode thicker. Metal vapor-deposition electrode 9A and low resistance portion 5B are connected to electrode 8B, such as a sprayed-metal electrode, formed on end 402B, and drawn externally.

Metallized films 1 and 10 are stacked such that lower surface 202A of dielectric film 2A is situated on upper surface 109A of metal vapor-deposition electrode 9A. Metal vapor-deposition electrode 4A faces metal vapor-deposition electrode 9A across dielectric film 2A at effective electrode portion 1001E. Effective electrode portion 1001E which has width W1 in direction 1001A (1001B) forms a capacitance of capacitor 1001. Metallized films 1 and 10 are stacked on each other, and rolled by plural turns about a center axis that extends in direction 1001A (1001B) so that upper surface 104A of metal vapor-deposition electrode 4A contacts lower surface 202B of dielectric film 2B. Thus, upper surface 104A of metal vapor-deposition electrode 4A faces lower surface 209A of metal vapor-deposition electrode 9A across dielectric film 2B within effective electrode portion 1001E.

Metal vapor-deposition electrode 4A includes non-divided electrode portion 4C that is located from the center of W1 of effective electrode portion 1001E in direction 1001A, plural divided electrode portions 4B that are located from the center of width W1 in direction 1001B, and plural fuses 7A. Non-divided electrode portion 4C and each of divided electrode portions 4B are separated from each other by slits 6A through which upper surface 102A of dielectric film 2A is exposed. Plural divided electrode portions 4B are separated from one another by slits 6A. Each of slits 6A is formed with oil that is transferred onto upper surface 102A before the forming of metal vapor-deposition electrode 4A. No electrode is formed in slits 6A. Plural divided electrode portions 4B are arranged in direction 1001C perpendicular to directions 1001A and 1001B. Plural divided electrode portions 4B are connected to non-divided electrode portion 4C through plural fuses 7A in parallel with one another, respectively.

Metal vapor-deposition electrode 9A includes non-divided electrode portion 9C that is located from a center of width W1 of effective electrode portion 1001E in direction 1001B, plural divided electrode portions 9B that are located from the center of width W1 in direction 1001A, and plural fuses 7B. Non-divided electrode portion 9C and each of divided electrode portions 9B are separated from each other by slits 6B through which upper surface 102B of dielectric film 2B is exposed. Plural divided electrode portions 9B are separated from one another by slits 6B. Each of slits 6B is formed with oil that is transferred onto upper surface 102B before forming of metal vapor-deposition electrode 4A. No electrode is formed in slits 6B. Plural divided electrode portions 9B are arranged in direction 1001C. Plural divided electrode portions 9B are connected to non-divided electrode portion 9C through plural fuses 7B in parallel with one another, respectively.

Dielectric films 2A and 2B are made of dielectric material, such as polypropylene, polyethylene terephthalate and polyphenylene sulfide.

Metal vapor-deposition electrodes 4A and 9A including divided electrode portions 4B and 9B and non-divided electrode portions 4C and 9C are formed by vapor-depositing an alloy containing aluminum and magnesium on upper surfaces 102A and 102B of dielectric films 2A and 2B, respectively. According to this embodiment, the alloy contains substantially only aluminum and magnesium, that is, 95 wt. % of aluminum and 5 wt. % of magnesium.

Low resistance portions 5A and 5B are formed by vapor-depositing zinc on non-divided electrode portions 4C and 9C of upper surfaces 104A and 109A of metal vapor-deposition electrodes 4A and 9A, respectively. Similarly to metal vapor-deposition electrodes 4A and 9A, low resistance portions 5A and 5B may be made of an alloy made of aluminum and magnesium. Metallized films 1 and 10 may not necessarily have low resistance portions 5A and 5B.

Figure 12:
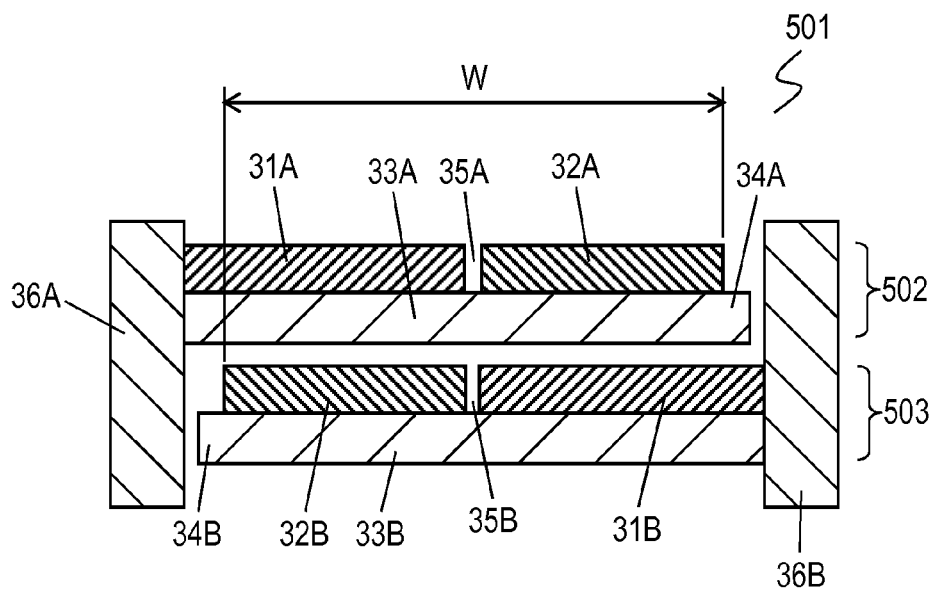
FIG. 12 is a cross-sectional view of a conventional metallized film capacitor.
Figure 13:
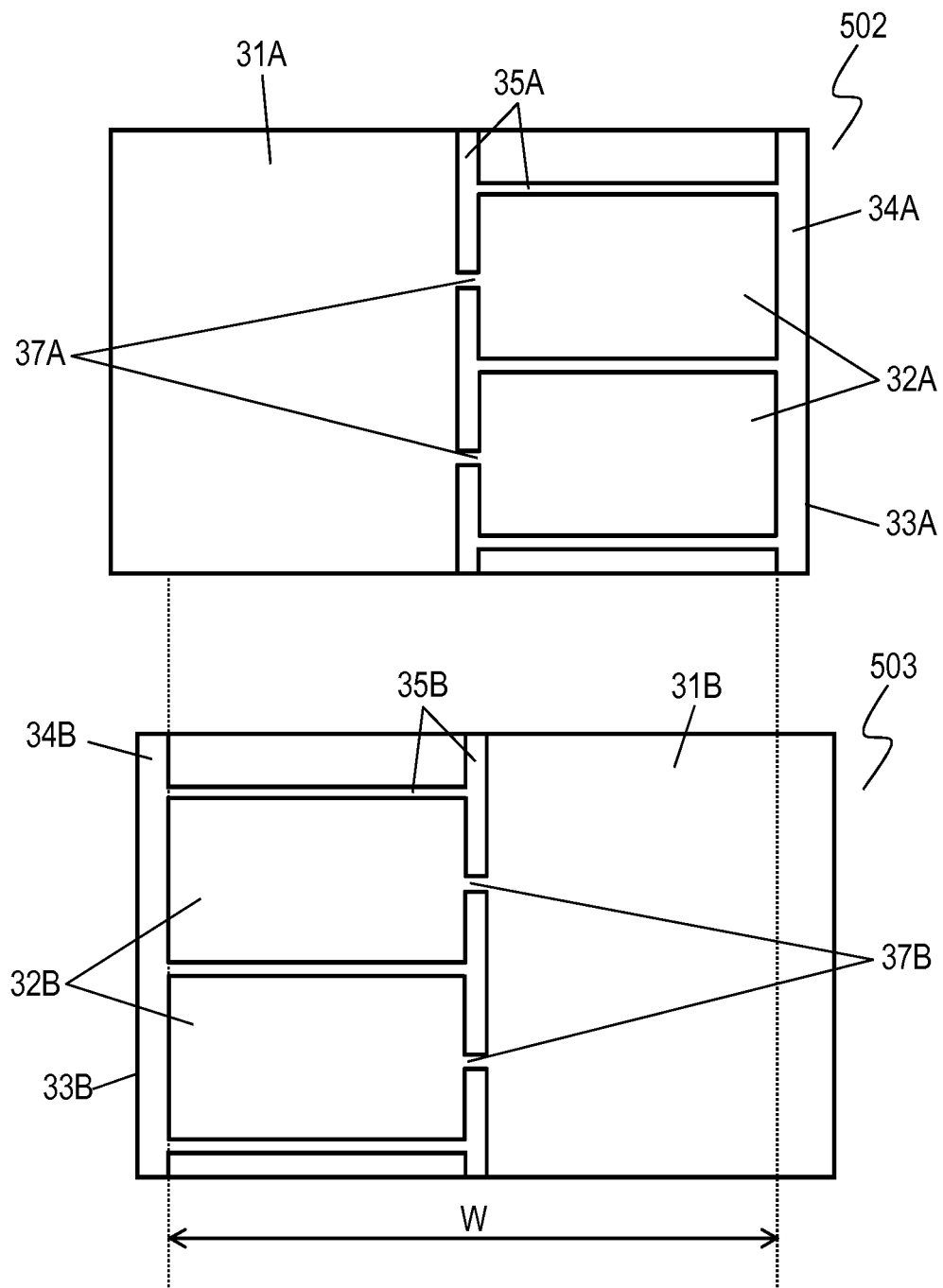
FIG. 13 is a plan view of a metallized film of the metallized film capacitor shown in FIG. 12.
Figure 14A:
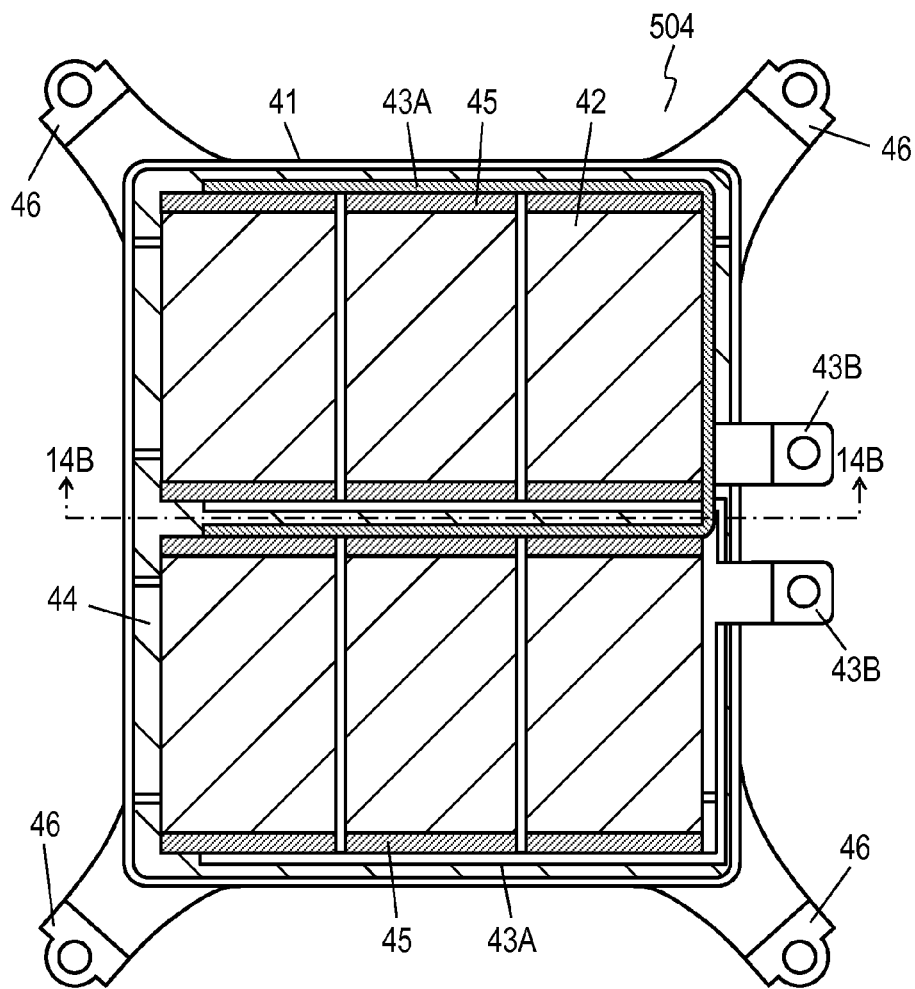
FIG. 14A is a cross-sectional plan view of a conventional case mold type capacitor.
Figure 14B:
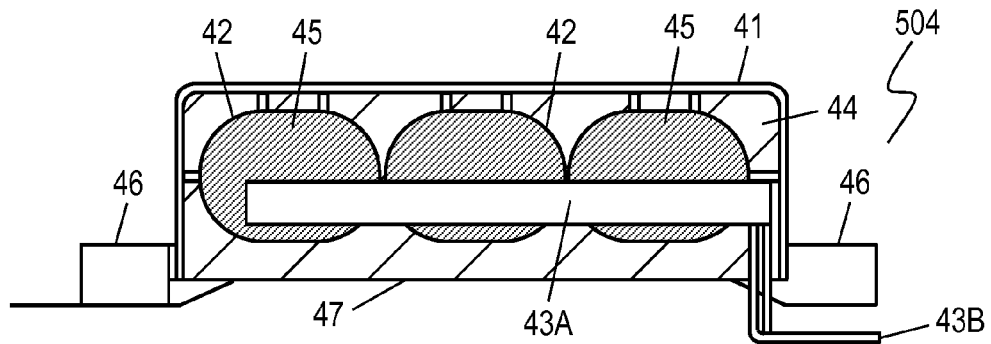
FIG. 14B is a cross-sectional view of the case mold type capacitor on line 14B-14B shown in FIG. 14A.

In conventional metallized film capacitor 501 shown in FIGS. 12 and 13, a leak current is mainly caused by moisture existing in its trace amount in metallized films 502 and 503 when moisture is moved by an electric field. Once a passage of the moisture is formed, moisture is then easily transferred, and increases the leak current. Reducing moisture in metallized films 502 and 503 reduces the leak current.

One of metallized films 502 and 503 of metallized film capacitor 501 functions as a positive electrode, while the other film functions as a negative electrode. When the leak current becomes larger due to moisture, reactions expressed by the following chemical formulas occur in the metallized film of the positive electrode.

$$Al + 3H_2O \rightarrow Al(OH)_3 + 3H^+ + 3e^-$$

$$2Al(OH)_3 \rightarrow Al_2O_3 + 3H_2O$$

A reaction expressed by the following chemical formula occurs in the metallized film of the negative electrode:

$$3H^+ + 3e^- \rightarrow 3/2 H_2$$

As expressed by the above chemical formulae, the metal vapor-deposition electrode made of aluminum forms aluminum oxide ($Al_2O_3$), which is an insulator, on the metallized film of the positive electrode, hence failing to function as a metal vapor-deposition electrode.

In metallized film capacitor 1001 in accordance with this embodiment, metal vapor-deposition electrodes 4A and 9A are made of alloy containing aluminum and magnesium. Magnesium in metal vapor-deposition electrodes 4A and 9A reacts with moisture on the inside and surface of metallized films 1 and 10 as expressed by the following chemical formula:

$$Mg + 2H_2O \rightarrow Mg(OH)_2 + H_2$$

Magnesium removes moisture from the inside and surface of metallized films 1 and 10 by a reaction expressed by the above chemical formula, and reduces passages of the leak current, accordingly preventing metal vapor-deposition electrodes 4A and 9A from deterioration. This reduces the leak current in metallized film capacitor 1001, and suppresses degradation of leak current preventive characteristics.

The Pourbaix index indicates thermodynamic stability of various metals, such as magnesium, relative to water. As the thermodynamic stability possessed by a metal becomes lower, the metal easily reacts with moisture, having a greater capability of removing moisture. Therefore, metals having stability as low as possible are suitably used as the metal for use in removing moisture. Moreover, when taken into consideration processes for vapor-depositing the metal, those metals having a high boiling point with a high vapor pressure are preferably used for the metal for use in removing moisture. Metals that satisfy these two demands include metals, such as magnesium, titanium and manganese, and among these, in particular, magnesium having a high vapor pressure is particularly preferable.

The low level in thermodynamic stability of metal relative to water, that is, easiness in reacting with water, is determined by the Pourbaix index as follows: Mg>Be>Ti>Al>Mn>Cr>Zn>Sn>Fe>Ni>C>Sb>Cu>Ag>Pt>Au.

Samples of metallized film capacitor 1001 having different mixing ratios of aluminum and magnesium of an alloy forming metal vapor-deposition electrodes 4A and 9A are prepared. In these samples, polypropylene films having a thickness of 3.0 μm are used as dielectric films 2A and 2B. The compositions of aluminum and magnesium in metal vapor-deposition electrodes 4A and 9A are measured with fluorescence X-rays (XRF). High-temperature and high-humidity current-carrying tests described below are carried out on these samples. The capacitance of these samples immediately after its fabrication is measured. Then, after a voltage of −600 V is applied for 900 hours in an environment of a temperature of 85° C. and a relative humidity of 80%, the capacitance is measured. A changing rate which is the ratio of a change of the capacitance in the high-temperature and high-humidity current-carrying tests to the capacitance immediately after its fabrication is calculated.

FIG. 3 shows the results of high-temperature and high-humidity current-carrying tests carried out on the samples of metallized film capacitor 1001, and indicates the changing rate of the capacitance. In FIG. 3, each sample of metallized film capacitor 1001 of the embodiment includes metal vapor-deposition electrodes 4A and 9A made of alloy of aluminum and magnesium. Moreover, in FIG. 3, each sample of conventional metallized film capacitor 501 shown in FIGS. 12 and 13, includes metal vapor-deposition electrodes 31A and 31B made of 100 wt. % of only aluminum. As shown in FIG. 3, metallized film capacitor 1001 in accordance with the embodiment has a smaller changing rate of the capacitance than conventional metallized film capacitor 501, and has a superior moisture resistant property. The moisture resistant property, that is, the changing rate of the capacitance depends on the amount of magnesium. As the amount of magnesium increases from 0.5 wt. %, 5 wt. %, and 15 wt. %, the changing rate of the capacitance decreases to improve the moisture resistant property. Moreover, even the samples having amounts of magnesium of 25 wt. % and 45 wt. %, the changing rate of the capacitance is smaller than the conventional capacitor to have a higher moisture resistant property. In particular, a sample having an amount of magnesium of 5 wt. % has a superior moisture resistant property having a changing rate of the capacitance of −3%, which is about 1/12 of that of the conventional capacitor.

The amount of magnesium exceeding 45 wt. % is not preferable since metal vapor-deposition electrodes 4A and 9A are hardly formed (vapor deposited). Moreover, an amount of magnesium of less than 0.5 wt. % reduces the effect. Therefore, the amount of metal vapor-deposition electrodes 4A and 9A ranges preferably from 0.5 wt. % to 45 wt. %. Since the amount of magnesium exceeding 25 wt. % causes degradation of weatherability of metal vapor-deposition electrodes 4A and 9A, the amount of magnesium may range more preferably from 0.5 wt. % to 25 wt. %.

The relationship between the distribution of magnesium in each of metal vapor-deposition electrodes 4A and 9A and the changing rate of the capacitance is examined.

Figure 4:
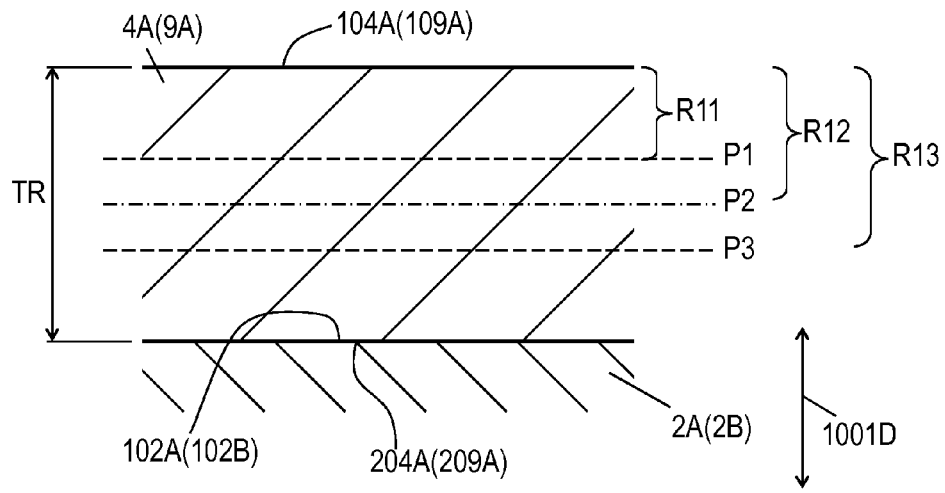
FIG. 4 shows distribution of magnesium in a metal vapor-deposition electrode and the results of high-temperature and high-humidity current-carrying tests of the metallized film capacitor in accordance with the embodiment.

FIG. 4 shows the distribution of magnesium in metal vapor-deposition electrodes 4A and 9A and the results of high-temperature and high-humidity current-carrying tests. FIG. 4 indicates thickness positions P1 to P3 of metal vapor-deposition electrodes 4A and 9A. Each of metal vapor-deposition electrodes 4A and 9A has thickness TR, the distance from each of upper surfaces 104A and 109A to each of lower surfaces 204A and 209A in thickness direction 1001D perpendicular to upper surfaces 104A and 109A. Thickness position P1 is apart from upper surface 104A (109A) of metal vapor-deposition electrode 4A (9A) by a distance of ⅓ of thickness TR. Thickness position P2 is apart from upper surface 104A (109A) of metal vapor-deposition electrode 4A (9A) by a distance of ½ of thickness TR. Thickness position P3 is apart from upper surface 104A (109A) of metal vapor-deposition electrode 4A (9A) by a distance of ⅔ of thickness TR. The region from upper surface 104A (109A) to thickness position P1, the region from upper surface 104A (109A) to thickness position P2, and the region from upper surface 104A (109A) to thickness position P3 are defined as region R11, region R12, and region R13, respectively.

In metallized film capacitor 1001 including metal vapor-deposition electrodes 4A and 9A made of an alloy of aluminum and magnesium, samples of Examples 1 to 4 having different distributions of magnesium are prepared. In the sample of Example 1, magnesium is distributed virtually uniformly in the entire thickness TR of metal vapor-deposition electrode 4A (9A). In the sample of Example 2, a position having a maximum concentration of magnesium is located within region R13 of metal vapor-deposition electrode 4A (9A). In the sample of Example 3, a position having a maximum concentration of magnesium is located within region R12 of metal vapor-deposition electrode 4A (9A). In the sample of Example 4, a position having a maximum concentration of magnesium is located within region R11 of metal vapor-deposition electrode 4A (9A). The distribution of magnesium in metal vapor-deposition electrode 4A (9A) of each sample is measured by alternately repeating an X-ray photoelectric spectral analysis (XPS) and an ion sputtering process, and then tracing a change in spectrum.

In the sample of Example 1, concentration of magnesium around upper surface 104A (109A) of metal vapor-deposition electrode 4A (9A) and around lower surface 204A (209A) are the same. More specifically, the concentration of magnesium around upper surface 104A (109A) is slightly higher than around lower surface 204A (209A). The concentration of magnesium is gradually reduced from upper surface 104A (109A) toward lower surface 204A (209A).

FIG. 4 indicates an average of changing rates of the capacitance of the samples having different concentration of magnesium in Examples 1 to 4. In the sample of metallized film capacitor 1001 of Example 2 containing 2 wt. % of magnesium, a changing rate of the capacitance of −9% is found according to the results of high-temperature and high-humidity current-carrying tests. Additionally, magnesium has a high ionization tendency so that magnesium on the positive electrode is supposed to be transferred to the negative electrode during the high-temperature and high-humidity current-carrying test; however, the tendency of the distribution of magnesium changes little from the above distribution.

As shown in FIG. 4, the moisture resistant property of the metallized film capacitor changes also depending on the distribution of magnesium. It is found that, in the case where the ratio WA:WM of weight WA of aluminum to weight WM of magnesium ranges from 99.5:0.5 to 75:25, that is, the concentration of magnesium ranges from 0.5 wt. % to 25 wt. % with the depth that gives a peak of the concentration of magnesium at a position close to upper surface 104A (109A) of metal vapor-deposition electrode 4A (9A), as magnesium concentrates in a region as small as possible, the moisture resistant property is improved more effectively. In contrast, in the case that the ratio WA:WM of weight WA of aluminum to weight WM of magnesium is 55:45, that is, the concentration of magnesium is 45 wt. %, no improvement in moisture resistant property is obtained even when the region distributing magnesium is different.

In particular, in the case that ratio WA:WM of weight WA of aluminum to weight WM of magnesium ranges from 99.5:0.5 to 85:15, that is, the concentration of magnesium ranges from 0.5 wt. % to 15 wt. %, it is found that those samples in Examples 3 and 4 in which the peaks of concentration of magnesium are positioned in regions R11 and R12 has more preferable moisture resistant properties than the sample of Example 1 in which magnesium is uniformly distributed.

In other words, from the above examination, a metallized film capacitor in which the ratio WA:WM of weight WA of aluminum to weight WM of magnesium ranges from 99.5:0.5 to 85:15, that is, the concentration of magnesium ranges from 0.5 wt. % to 15 wt. % with the peak of concentration of magnesium positioned within the region of ½ of thickness TR from upper surface 104A (109A) of metal vapor-deposition electrode 4A (9A) has a superior moisture resistant property.

Figure 5:
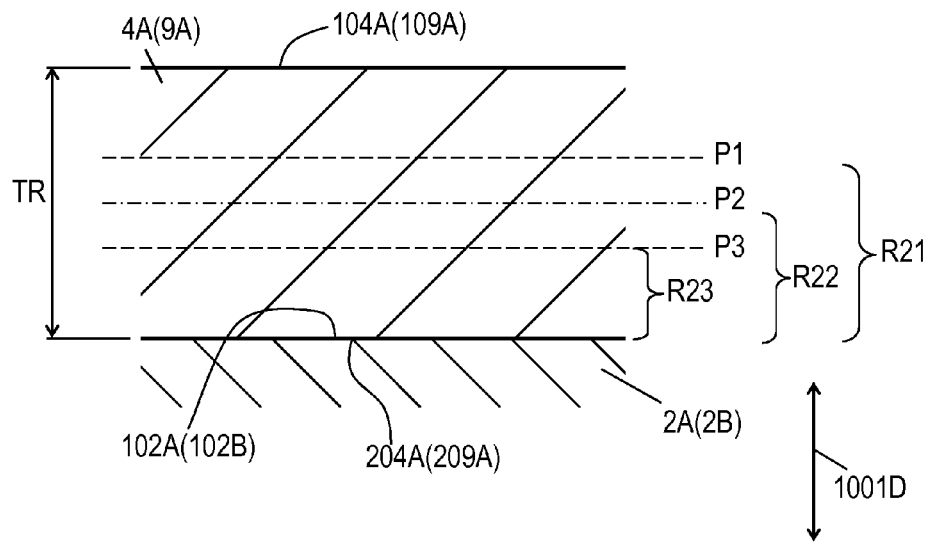
FIG. 5 is shows the distribution of magnesium in a metal vapor-deposition electrode and the results of high-temperature and high-humidity current-carrying tests of the metallized film capacitor in accordance with the embodiment.

FIG. 5 shows the distribution of magnesium in metal vapor-deposition electrodes 4A and 9A and the results of high-temperature and high-humidity current-carrying tests. A region from lower surface 204A (209A) to thickness position P3, a region from lower surface 204A (209A) to thickness position P2, and a region from lower surface 204A (209A) to thickness position P1 are defined as region R23, region R22, and region R21, respectively.

In metallized film capacitor 1001 including metal vapor-deposition electrodes 4A and 9A made of an alloy of aluminum and magnesium, samples of Examples 5 to 8 having different distributions of magnesium are prepared. In the sample of Example 5, magnesium is distributed substantially uniformly in the entire thickness TR of metal vapor-deposition electrode 4A (9A). In the sample of Example 6, a position having a maximum concentration of magnesium is within region R21 of metal vapor-deposition electrode 4A (9A). In the sample of Example 7, a position having a maximum concentration of magnesium is within region R22 of metal vapor-deposition electrode 4A (9A).

In the sample of Example 8, a position having a maximum concentration of magnesium is within region R23 of metal vapor-deposition electrode 4A (9A). The distribution of magnesium in metal vapor-deposition electrode 4A (9A) of each sample is measured by alternately repeating an X-ray photoelectric spectral analysis (XPS) and an ion sputtering process, and then tracing a change in spectrum.

FIG. 5 indicates an average of changing rates of the capacitance of the samples having different concentration of magnesium in Examples 5 to 8. In the sample of Example 5 in which magnesium is uniformly distributed in each of the entire metal vapor-deposition electrodes 4A and 9A, the concentrations of magnesium around upper surface 104A (109A) and magnesium around lower surface 204A (209A) are almost the same. More specifically, in the sample of Example 5, the concentration of magnesium around upper surface 104A (109A) is slightly higher than around lower surface 204A (209A), and the concentration of magnesium is gradually reduced from lower surface 204A (209A) toward upper surface 104A (109A).

As shown in FIGS. 4 and 5, the change of the capacitance of each sample of Examples 5 to 8 shown in FIG. 5 is greater than each sample of Examples 1 to 4 shown in FIG. 4. Thus, a metallized film capacitor having magnesium distributed more around upper surface 104A (109A) of metal vapor-deposition electrode 4A (9A) has a moisture resistant property that is superior to that a metallized film capacitor having magnesium distributed more around lower surface 204A (209A).

As shown in FIG. 5, in the case that the ratio WA:WM of weight WA of aluminum to weight WM of magnesium ranges from 99.5:0.5 to 75:25, that is, the concentration of magnesium ranges from 0.5 wt. % to 25 wt. % with the depth that gives a peak of the concentration of magnesium at a position close to lower surface 204A (209A) of metal vapor-deposition electrode 4A (9A), as magnesium concentrates in a region as small as possible, the moisture resistant property is improved more effectively.

Moreover, in the case of metallized films in which the ratio WA:WM of weight WA of aluminum to weight WM of magnesium ranges from 99.5:0.5 to 85:15, that is, the concentration of magnesium ranges from 0.5 wt. % to 15 wt. %, those films in which the peaks of concentration of magnesium positioned in regions R22 and R23 remarkably improve their moisture resistant properties in comparison with the film in which magnesium is uniformly distributed in the metal vapor-deposition electrode, thus providing the same effects as those in FIG. 4.

Upon vapor-depositing aluminum and magnesium onto dielectric films 2A and 2B, the position, temperature and shape of a vapor-deposition boat, as well as a mixing ratio of aluminum and magnesium of a wire to be supplied to the vapor-deposition boat, etc., are appropriately adjusted. With this arrangement, magnesium can be distributed unevenly around upper surface 104A and 109A or around lower surface 204A and 209A of metal vapor-deposition electrodes 4A and 9A so that the concentration of magnesium can be changed in depth direction 1001D.

Alternatively, metal materials of aluminum and magnesium may be supplied to different vapor-deposition boats, and metal vapors of aluminum and magnesium are successively vapor-deposited onto dielectric film 2A (2B) from the respective vapor-deposition sources. This process distributes magnesium unevenly to concentrate around upper surface 104A and 109A or around lower surface 204A and 209A of metal vapor-deposition electrodes 4A and 9A so that the concentration of magnesium changes in depth direction 1001D.

As described above, a maximum concentration of magnesium in at least one metal vapor-deposition electrode of metal vapor-deposition electrodes 4A and 9A is located in a region from the upper surface of the metal vapor-deposition electrode to a distance of ½ of thickness TR. Alternatively, the maximum concentration of magnesium is located in a region from the lower surface of the metal vapor-deposition electrode to a distance of ½ of thickness TR. This arrangement remarkably improves the moisture resistant property of the metal vapor-deposition thin film.

More preferably, the maximum concentration of magnesium in at least one metal vapor-deposition electrode of metal vapor-deposition electrodes 4A and 9A is located in a region from the upper surface of the metal vapor-deposition electrode to a distance of ⅓ of thickness TR. Alternatively, the maximum concentration of magnesium is located in a region from the lower surface of the metal vapor-deposition electrode to a distance of ⅓ of thickness TR. This arrangement remarkably improves the moisture resistant property of the metal vapor-deposition film.

As described above, metallized film 1 includes dielectric film 2A and metal vapor-deposition electrode 4A provided on upper surface 102A of dielectric film 2A. Metallized film 10 includes dielectric film 2B and metal vapor-deposition electrode 9A provided on upper surface 102B of dielectric film 2B. Upper surface 109A of metal vapor-deposition electrode 9A faces lower surface 204A of metal vapor-deposition electrode 4A across dielectric film 2A. At least one metal vapor-deposition electrode of metal vapor-deposition electrodes 4A and 9A is made of substantially only aluminum and magnesium. The metal vapor-deposition electrode is made of an alloy containing aluminum and magnesium. The amount of magnesium in the alloy ranges from 0.5 wt. % to 15 wt. %, and magnesium is distributed unevenly in the metal vapor-deposition electrode. The maximum concentration of magnesium in the metal vapor-deposition electrode is located in a region from the upper surface of the metal vapor-deposition electrode to a distance of ½ of the thickness of the metal vapor-deposition electrode. Alternatively, the maximum concentration of magnesium in the metal vapor-deposition electrode is located in a region from the lower surface of the metal vapor-deposition electrode to a distance of ½ of the thickness of the metal vapor-deposition electrode.

According to this embodiment, both of metal vapor-deposition electrodes 4A and 9B are made of an alloy containing aluminum and magnesium. In a metallized film capacitor according to this embodiment, only one of metal vapor-deposition electrodes 4A and 9A may be made of the alloy, and the other may be made of only aluminum, providing almost the same effects. As described above, aluminum in the metal vapor-deposition electrode functioning as a positive electrode changes to aluminum oxide ($Al_2O_3$), an aluminum insulator, due to moisture, prevents the metal vapor-deposition electrode from functioning as an electrode. In the case that only one of metal vapor-deposition electrodes 4A and 9A is made of the alloy, the metal vapor-deposition electrode out of metal vapor-deposition electrodes 4A and 9A functioning as the positive electrode is made of the alloy, thereby improving the moisture resistant property.

Thus, a metal vapor-deposition electrode out of metal vapor-deposition electrodes 4A and 9A functioning as the positive electrode may be made of the alloy containing aluminum and magnesium, and a metal vapor-deposition electrode functioning as a negative electrode may be made of only aluminum. This structure provides metallized film capacitor 1001 with superior moisture resistant characteristic and voltage resistance characteristic. In such a metal vapor-deposition electrode, in the event of occurrence of short-circuit at an insulation defective portion, a portion on the periphery of the defective portion of the metal vapor-deposition electrode is evaporated and scattered by the energy of the short-circuit to have an insulating property. Thus, the metal vapor-deposition electrode has a self-recovering function for recovering the functions as a capacitor. Since the self-recovering function of magnesium is not so strong, the metal vapor-deposition electrode that is made of the alloy containing aluminum and magnesium and functions as the positive electrode may not necessarily include the fuses.

Figure 6A:
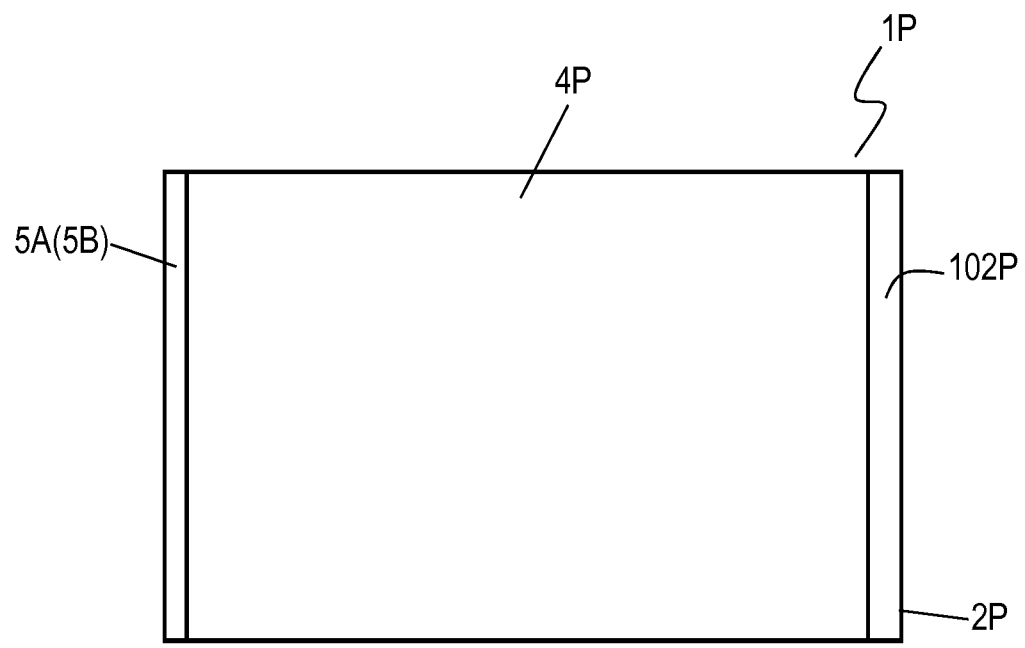
FIG. 6A is a plan view of another metallized film in accordance with the embodiment.

FIG. 6A is a plan view of another metallized film 1P in accordance with the embodiment. Metallized film 1P includes dielectric film 2P and metal vapor-deposition electrode 4P provided on upper surface 102P of dielectric film 2P. Dielectric film 2P is made of material identical to that of dielectric films 2A and 2B shown in FIGS. 1 and 2. Metal vapor-deposition electrode 4P is made of substantially only aluminum and magnesium similarly to metal vapor-deposition electrodes 4A and 9A shown in FIGS. 1 and 2, and functions as a positive electrode. Metal vapor-deposition electrode 4P is made of a single non-divided electrode portion as a whole, and is not divided by slits.

Figure 6B:
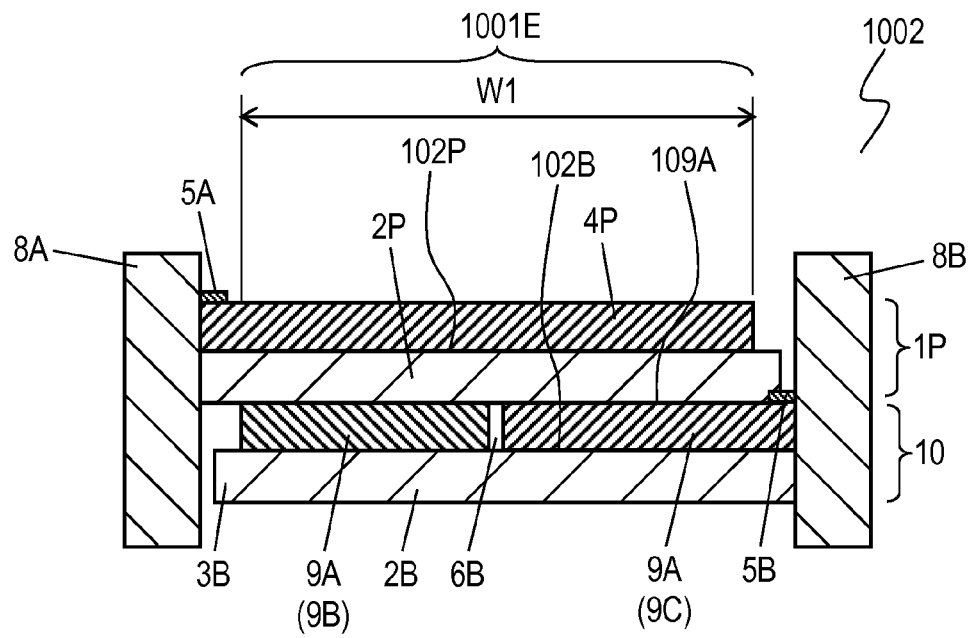
FIG. 6B is a cross-sectional view of another metallized film capacitor in accordance with the embodiment.

FIG. 6B is a cross-sectional view of still another metallized film capacitor 1002 in accordance with the embodiment. In the case that metal vapor-deposition electrode 9A of metallized film capacitor 10 shown in FIGS. 1 and 2 functions as a negative electrode, metallized film capacitor 1002 includes metallized film 1P shown in FIG. 6A instead of metallized film 1. In this case, metal vapor-deposition electrode 9A functioning as the negative electrode is made of substantially only aluminum. As shown in FIG. 6B, non-divided electrode portion 9C and plural divided electrode portions 9B of metal vapor-deposition electrode 9A face metal vapor-deposition electrode 4P made of a single non-divided electrode portion across dielectric film 2P. This structure allows the fuses to function sufficiently and improves the moisture resistant property, thus providing metallized film capacitor 1002 with superior voltage resistance characteristics.

Figure 6C:
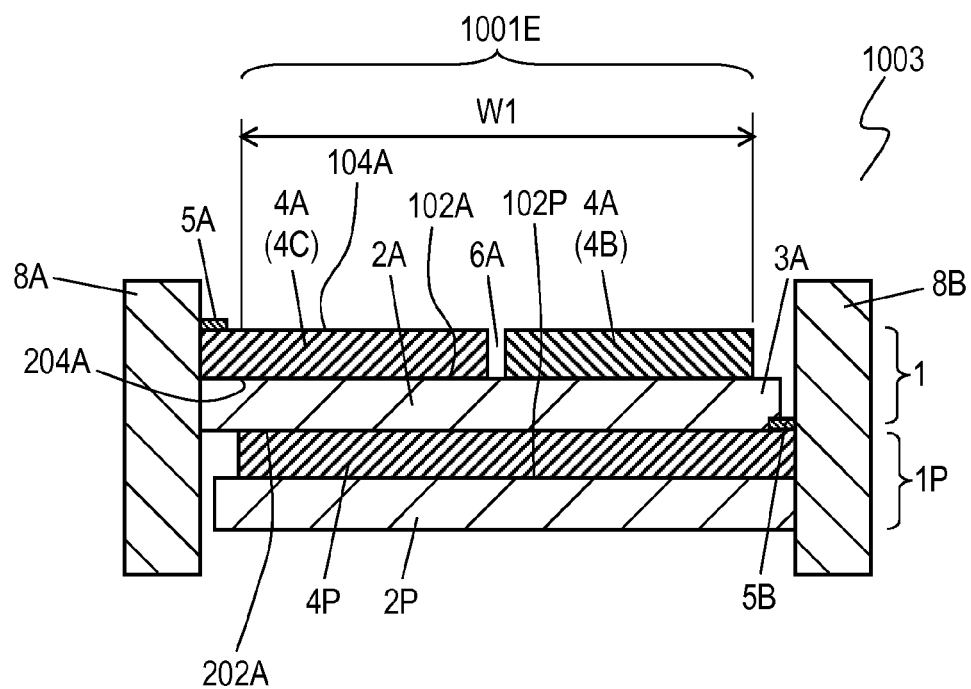
FIG. 6C is a cross-sectional view of still another metallized film capacitor in accordance with the embodiment.

FIG. 6C is a cross-sectional view of further metallized film capacitor 1003 in accordance with the embodiment. In the case that metal vapor-deposition electrode 4A of metallized film capacitor 1 shown in FIGS. 1 and 2 functions as a negative electrode, metallized film capacitor 1003 includes metallized film 1P shown in FIG. 6A instead of metallized film 10. In this case, metal vapor-deposition electrode 4A functioning as the negative electrode is made of substantially only aluminum. As shown in FIG. 6C, non-divided electrode portion 4C and plural divided electrode portions 4B of metal vapor-deposition electrode 4A face metal vapor-deposition electrode 4P made of a single non-divided electrode portion across dielectric film 2A. This structure allows the fuses to function sufficiently and improves the moisture resistant property, thus providing metallized film capacitor 1003 with superior voltage resistance characteristics.

Figure 7A:
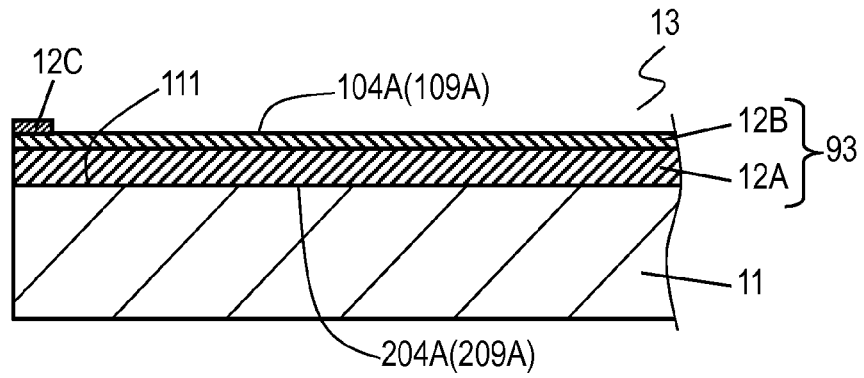
FIG. 7A is a cross-sectional view of a further metallized film in accordance with the embodiment.

FIG. 7A is a cross-sectional view of another metallized film 13 of metallized film capacitor 1001 according to the embodiment. In FIG. 7A, components identical to those of metallized films 1 and 10 shown in FIG. 1 are denoted by the same reference numerals. Metallized film 13 includes dielectric film 11, metal vapor-deposition electrode 93 provided on upper surface 111 of dielectric film 11, and low resistance portion 12C provided on an upper surface of metal vapor-deposition electrode 93. Dielectric film 11 corresponds to each of dielectric films 2A and 2B shown in FIG. 1 and is made of the same material as dielectric films 2A and 2B. Metal vapor-deposition electrode 93 includes metal vapor-deposition layer 12A provided on upper surface 111 of dielectric film 11 and metal vapor-deposition layer 12B provided on an upper surface of metal vapor-deposition layer 12A. Metal vapor-deposition layer 12A mainly contains aluminum. Metal vapor-deposition layer 12B contains magnesium. Low resistance portion 12 corresponds to each of low resistance portions 5A and 5B shown in FIG. 1, is made of the same material as low resistance portions 5A and 5B, and is installed at the same position. A lower surface of metal vapor-deposition layer 12A corresponds to lower surface 204A (209A) of metal vapor-deposition electrode 4A (9A). An upper surface of metal vapor-deposition layer 12B corresponds to upper surface 104A (109A) of metal vapor-deposition electrode 4A (9A) shown in FIG. 1.

Metal vapor-deposition electrode 93 includes only metal vapor-deposition layers 12A and 12B. As described above, the ratio WA:WM of weight WA of metal vapor-deposition layer 12A made of aluminum to weight WM of metal vapor-deposition layer 12B made of magnesium ranges preferably from 99.5:0.5 to 55:45. That is, in metal vapor-deposition electrode 93, the amount of metal vapor-deposition layer 12B ranges preferably from 0.5 wt. % to 45 wt. %. Metal vapor-deposition layer 12A may be made of only aluminum. Alternatively, metal vapor-deposition layer 12A may contain more concentration of aluminum than magnesium. The concentration of magnesium of metal vapor-deposition layer 12B is higher than that of metal vapor-deposition layer 12A.

Figure 7B:
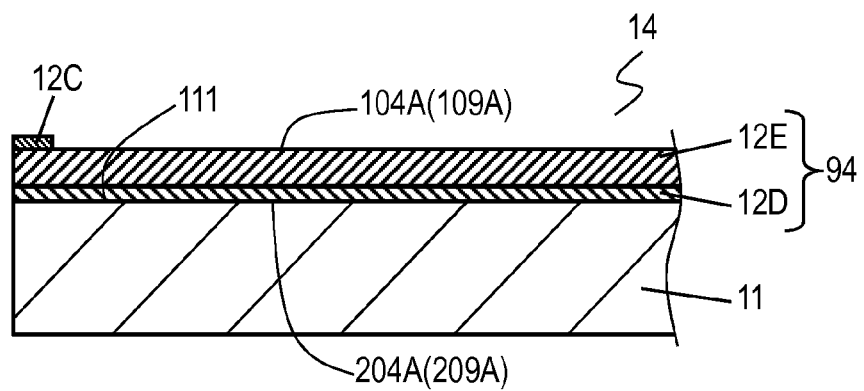
FIG. 7B is a cross-sectional view of a further metallized film in accordance with the embodiment.

FIG. 7B is a cross-sectional view of further metallized film 14 of metallized film capacitor 1001 according to the embodiment. In FIG. 7B, components identical to those of metallized films 1 and 10 shown in FIG. 1 are denoted by the same reference numerals. Metallized film 14 includes dielectric film 11, metal vapor-deposition electrode 94 provided on upper surface 111 of dielectric film 11, and low resistance portion 12C provided on an upper surface of metal vapor-deposition electrode 94. Dielectric film 11 corresponds to each of dielectric films 2A and 2B shown in FIG. 1, and is made of the same material as dielectric films 2A and 2B. Metal vapor-deposition electrode 94 includes metal vapor-deposition layer 12D provided on upper surface 111 of dielectric film 11 and metal vapor-deposition layer 12E provided on an upper surface of metal vapor-deposition layer 12D. Metal vapor-deposition layer 12D contains magnesium. Metal vapor-deposition layer 12E mainly contains aluminum. Low resistance portion 12C corresponds to each of low resistance portions 5A and 5B shown in FIG. 1, is made of the same material as low resistance portions 5A and 5B, and installed at the same position. A lower surface of metal vapor-deposition layer 12D corresponds to lower surface 204A (209A) of metal vapor-deposition electrode 4A (9A). An upper surface of metal vapor-deposition layer 12E corresponds to upper surface 104A (109A) of metal vapor-deposition electrode 4A (9A) shown in FIG. 1.

Metal vapor-deposition electrode 94 includes only metal vapor-deposition layers 12D and 12E. As described above, the ratio WA:WM of weight WA of metal vapor-deposition layer 12E made of aluminum to weight WM of metal vapor-deposition layer 12D made of magnesium ranges preferably from 99.5:0.5 to 55:45. That is, in metal vapor-deposition electrode 94, the amount of metal vapor-deposition layer 12D ranges preferably from 0.5 wt. % to 45 wt. %. Metal vapor-deposition layer 12E may be made of only aluminum. Alternatively, metal vapor-deposition layer 12E may contain more concentration of aluminum than magnesium. The concentration of magnesium of metal vapor-deposition layer 12D is higher than that of metal vapor-deposition layer 12E.

Figure 7C:
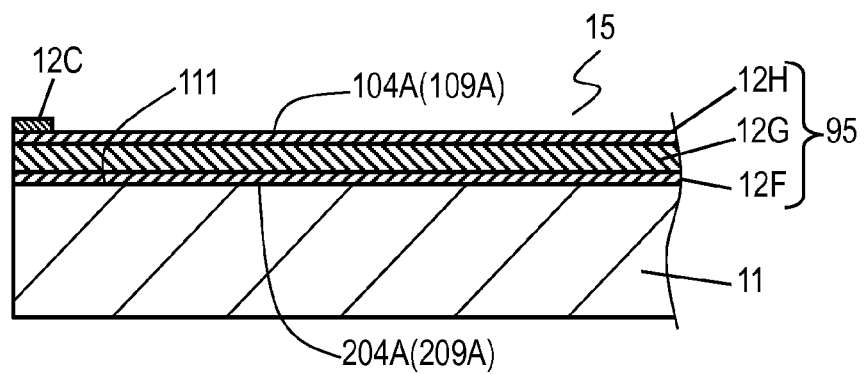
FIG. 7C is a cross-sectional view of a further metallized film in accordance with the embodiment.

FIG. 7C is a cross-sectional view of still another metallized film 15 of metallized film capacitor 1001 according to the embodiment. In FIG. 7C, components identical to those of metallized films 1 and 10 shown in FIG. 1 are denoted by the same reference numerals. Metallized film 15 includes dielectric film 11, metal vapor-deposition electrode 95 provided on upper surface 111 of dielectric film 11, and low resistance portion 12C provided on an upper surface of metal vapor-deposition electrode 95. Dielectric film 11 corresponds to each of dielectric films 2A and 2B shown in FIG. 1, and is made of the same material as low resistance portions 5A and 5B. Metal vapor-deposition electrode 95 includes metal vapor-deposition layer 12F provided on upper surface 111 of dielectric film 11, metal vapor-deposition layer 12G provided on an upper surface of metal vapor-deposition layer 12F, and metal vapor-deposition layer 12H provided on an upper surface of metal vapor-deposition layer 12G. Metal vapor-deposition layer 12F contains magnesium. Metal vapor-deposition layer 12G mainly contains aluminum. Metal vapor-deposition layer 12H contains magnesium. Low resistance portion 12C corresponds to each of low resistance portions 5A and 5B shown in FIG. 1, is made of the same material as low resistance portions 5A and 5B, and is installed at the same position as low resistance portions 5A and 5B. A lower surface of metal vapor-deposition layer 12F corresponds to lower surface 204A (209A) of metal vapor-deposition electrode 4A (9A) shown in FIG. 1. An upper surface of metal vapor-deposition layer 12H corresponds to upper surface 104A (109A) of metal vapor-deposition electrode 4A (9A) shown in FIG. 1.

Metal vapor-deposition electrode 95 includes only metal vapor-deposition layers 12F, 12G, and 12H. Similarly to Example 1, the ratio WA:WM of weight WA of metal vapor-deposition layer 12G made of aluminum to weight WM of the sum of weights of metal vapor-deposition layers 12F and 12H made of magnesium ranges preferably from 99.5:0.5 to 55:45. In other words, in metal vapor-deposition electrode 95, the sum of the amounts of metal vapor-deposition layers 12F and 12H ranges preferably from 0.5 wt. % to 45 wt. %. Metal vapor-deposition layer 12G may be made of only aluminum. Alternatively, metal vapor-deposition layer 12G may contain more concentration of aluminum than magnesium. The concentration of magnesium of metal vapor-deposition layers 12F and 12H is higher than that of metal vapor-deposition layer 12G.

Low resistance portion 12C is formed by vapor-depositing zinc. Low resistance portion 12C may be made of either aluminum or magnesium. Moreover, each of metal vapor-deposition electrodes 93 to 95 can have the same effects even when low resistance portion 12C is not provided thereon.

Similarly to metal vapor-deposition electrodes 4A and 9A shown in FIG. 1, metal vapor-deposition electrodes 93 to 95 provide metallized film capacitor 1001 with a superior moisture resistant property.

The positional relationship (order of formations) between metal vapor-deposition layers made of aluminum and metal vapor-deposition layers made of magnesium to be formed on upper surface 111 of dielectric film 11 shown in FIGS. 7A to 7C is not limited to any one of orders, but any of the orders may be used with the same effects.

However, in the case that metal vapor-deposition layer 12B made of magnesium is provided at the outermost surface as shown in FIG. 7A, a naturally-oxidized layer is formed on the surface of metal vapor-deposition layer 12B made of magnesium. This naturally-oxidized layer acts as a protective layer that protects metal vapor-deposition layer 12A made of aluminum, hence preventing degradation of moisture resistant property.

As shown in FIG. 7B, in the case that metal vapor-deposition layer 12E made of aluminum is provided at the outermost surface, metal vapor-deposition layer 12D made of magnesium is located between dielectric film 11 and metal vapor-deposition layer 12E. Metal vapor-deposition layer 12D prevents moisture from coming out of dielectric film 11 and permeating into metal vapor-deposition layer 12E, thereby improving the moisture resistant property of metal vapor-deposition layer 12E made of aluminum. Moreover, metal vapor-deposition layer 12D made of magnesium can adhere firmly to aluminum of metal vapor-deposition layer 12E, accordingly providing a dense crystal structure of aluminum.

In the case that metal vapor-deposition layers 12F and 12H made of magnesium are provided on upper and lower surfaces of metal vapor-deposition layer 12G made of aluminum as shown in FIG. 7C, oxidative degradation of metal vapor-deposition layer 12G is suppressed, hence providing a preferable moisture resistant performance. The structures shown in FIGS. 7A to 7C are selected appropriately according to the purpose.

Figure 8A:
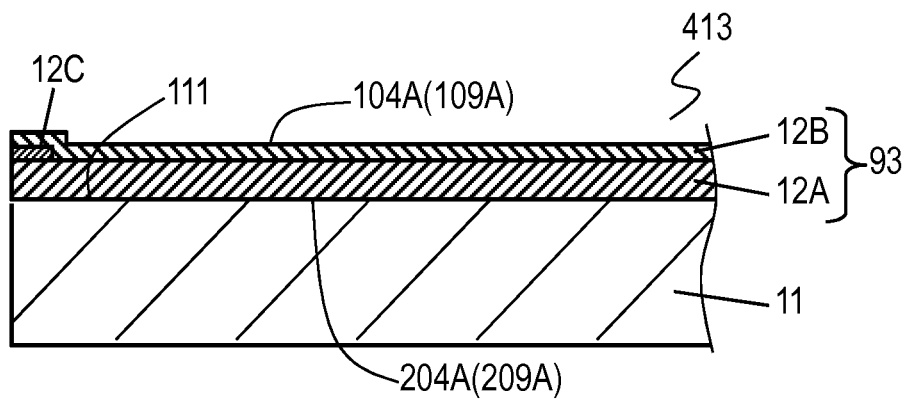
FIG. 8A is a cross-sectional view of a further metallized film in accordance with the embodiment.

FIG. 8A is a cross-sectional view of further metallized film 413 of metallized film capacitor 1001 according to the embodiment. In FIG. 8A, components identical to those of metallized film 13 shown in FIG. 7A are denoted by the same reference numerals. Low resistance portion 12C made of zinc is provided on an upper surface of metal vapor-deposition layer 12A made of aluminum, and metal vapor-deposition layer 12B made of magnesium may be provided on an upper surface of low resistance portion 12C. Metal vapor-deposition layer 12B made of magnesium suppresses oxidative deterioration of low resistance portion 12C made of zinc.

Figure 8B:
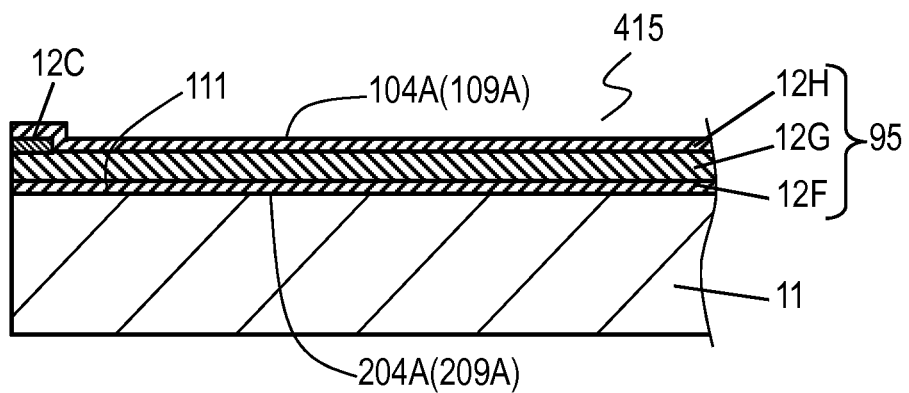
FIG. 8B is a cross-sectional view of a further metallized film in accordance with the embodiment.

FIG. 8B is a cross-sectional view of further metallized film 415 of metallized film capacitor 1001 according to the embodiment. In FIG. 8B, components identical to those of metallized film 15 shown in FIG. 7C are denoted by the same reference numerals. Low resistance portion 12C made of zinc is provided on an upper surface of metal vapor-deposition layer 12G made of aluminum, and metal vapor-deposition layer 12H made of magnesium may be provided on an upper surface of low resistance portion 12C. Metal vapor-deposition layer 12H made of magnesium suppresses oxidative deterioration of low resistance portion 12C made of zinc.

Figures 9, 10:
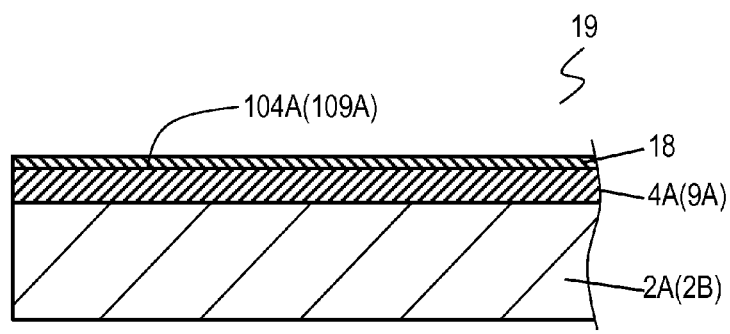
FIG. 9 is a cross-sectional view of a further metallized film capacitor in accordance with the embodiment.
FIG. 10 shows the results of high-temperature and high-humidity current-carrying tests of the metallized film capacitor in accordance with the embodiment.

FIG. 9 is a cross-sectional view of further metallized film 19 to be used in metallized film capacitors 1001, 1002 and 1003 in accordance with the embodiment. In FIG. 9, components identical to those of metallized films 1 and 10 shown in FIG. 1 are denoted by the same reference numerals.

Metallized film 19 further includes with oxide film 18 provided on upper surface 104A (109A) of metal vapor-deposition electrode 4A (9A) of metallized film 1 (10) shown in FIG. 1. Oxide film 18 can be formed by introducing oxygen into a vacuum vessel used for forming metal vapor-deposition electrode 4A (9A). That is, oxide film 18 is made of a metal oxide obtained by oxidizing a metal material exposed on upper surface 104A (109A) of metal vapor-deposition electrode 4A (9A). According to this embodiment, the amount of oxygen to be introduced to the vacuum vessel per unit area of 1 m$^2$ of metallized film 1 (10) ranges preferably from 0.05 cc to 0.15 cc under a standard state, i.e., one atmospheric pressure (1.01325×10$^5$ Pa) at 25° C.; however, this is not limited to it.

Metallized film 19 may include low resistance portion 5A (5B) shown in FIG. 1, and the presence or absence of low resistance portion 5A (5B) does not affect the effects of the present embodiment.

Similarly to metallized films 1 and 10, metallized film 19 has a superior moisture resistant property due to magnesium contained in metal vapor-deposition electrodes 4A and 9A. In metallized film 19, oxide film 18 prevents moisture (H) from being taken into metal vapor-deposition electrode 4A (9A), thereby improving its moisture resistant property.

Samples of metallized film capacitor 1001 including metallized film 19 instead of metallized films 1 and 10 shown in FIG. 1 are prepared. High-temperature and high-humidity current-carrying tests are carried out on these samples as described above so that the changing ratio of the capacitance is measured.

FIG. 10 shows the results, i.e., the changing rate of the capacitance thereof of high-temperature and high-humidity current-carrying tests carried out on the samples of Example 9 of metallized film capacitor 1001 including metallized film 19. FIG. 10 also shows the changing rate of the capacitance of a comparative example of a metallized film capacitor without the oxide film in which magnesium is uniformly distributed over the entire metal vapor-deposition electrode.

As shown in FIG. 10, the metallized film capacitor of Example 9 including oxidized film 18 has a smaller changing rate in all the compositions of metal vapor-deposition electrodes 4A (9A) than the metallized film capacitor of the comparative example, thus having a superior moisture resistant property.

Metal vapor-deposition electrode 4A (9A) is made of an alloy containing only aluminum and magnesium, and oxide film 18 is formed by causing oxygen to react with upper surface 104A (109A) of metal vapor-deposition electrode 4A (9A). This structure improves a moisture resistant property of the metallized film capacitor.

Oxide film 18 is formed on upper surface 104A (109A) of metal vapor-deposition electrode 4A (9A) with magnesium contained unevenly around upper surface 104A and 109A, and improves the moisture resistant property of the metallized film capacitor. Oxide film 18 is formed on upper surface 104A (109A) of each of metal vapor-deposition electrodes 93 to 95 shown in FIGS. 7A to 7C, and improves the moisture resistant property of the metallized film capacitor.

Figure 11:
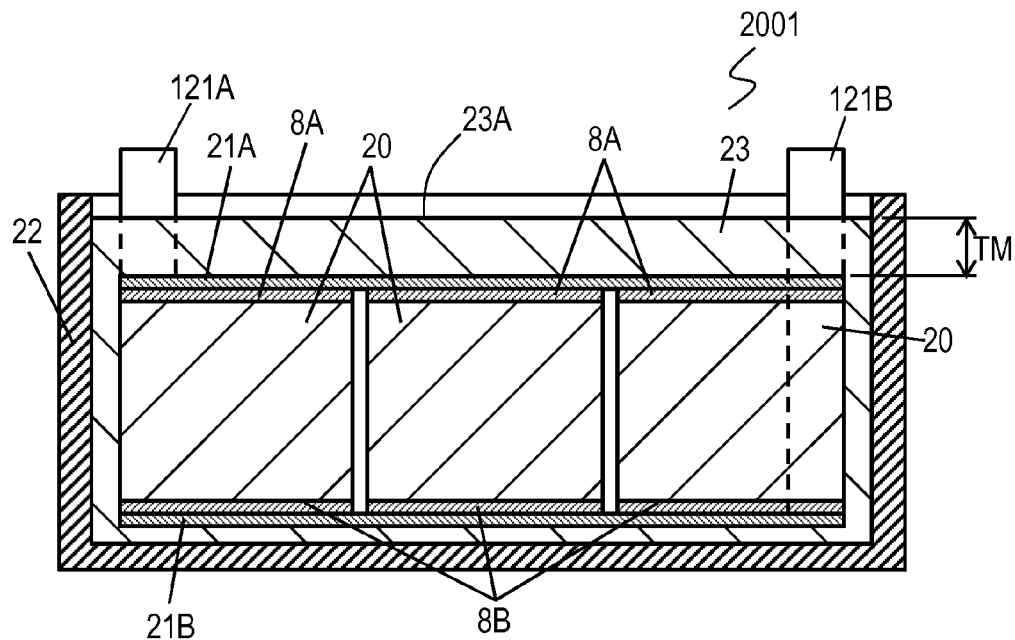
FIG. 11 is a cross-sectional view of a case mold type capacitor in accordance with the embodiment.

FIG. 11 is a cross-sectional view of case mold type capacitor 2001 in accordance with the embodiment. Case mold type capacitor 2001 includes plural metallized film capacitors 20 and bus bars 21A and 21B connected to both ends of each of plural metallized film capacitors 20. Bus bars 21A and 21B connect plural metallized film capacitors 20 in parallel with one another.

Case mold type capacitor 2001 further includes case 22 made of an insulating resin, such as polyphenylene sulfide, and molding resin 23 made of an insulating resin, such as an epoxy resin. Case 22 accommodates plural metallized film capacitors 20 that are connected to one another by bus bars 21A and 21B in parallel with one another. Molding resin 23 covers bus bars 21A and 21B and plural metallized film capacitors 20. Bus bars 21A and 21B include terminal portions 121A and 121B that are exposed from molding resin 23. Terminal portions 121A and 121B are configured to be connected to an external apparatus.

Each of plural metallized film capacitors 20 is metalized film capacitor 1001 shown in FIG. 1. Bus bars 21A and 21B are connected to electrodes 8A and 8B of metallized film capacitor 1001, respectively. Since metallized film capacitor 20 has a high moisture resistant property, the amount of molding resin 23 filling case 22 can be reduced, consequently providing the capacitor with a small size, a light weight, and low costs. According to this embodiment, thickness TM from surface 23A on which molding resin 23 is exposed to metallized film capacitor 20 is 8 mm. Depending on positions of plural metallized film capacitors 20, at least one of plural metallized film capacitors 20 may be metallized film capacitor 1001 (1002, 1003) shown in FIG. 1 (FIGS. 6B and 6C), providing the same effects.

In this embodiment, terms, such as "upper surface" and "lower surface", indicating directions indicate relative directions depending only on relative positional relations among components, such as metallized films 1 and 10, of metallized film capacitor 1001, and do not indicate absolute directions, such as a vertical direction.

INDUSTRIAL APPLICABILITY

A metallized film capacitor according to the present invention has a superior moisture resistant property, and provides a small-size case mold type capacitor, being applicable particularly to, e.g., automobiles requiring a high moisture resistant property in addition to a small size and a light weight as well as low costs.

REFERENCE MARKS IN THE DRAWINGS

1 Metallized Film (First Metallized Film)
2A Dielectric Film (First Dielectric Film)
2B Dielectric Film (Second Dielectric Film)
4A Metal Vapor-Deposition Electrode (First Metal Vapor-Deposition Electrode)
8A Electrode (First Electrode)
8B Electrode (Second Electrode)
9A Metal Vapor-Deposition Electrode (Second Metal Vapor-Deposition Electrode)
10 Metallized Film (Second Metallized Film)
12A Metal Vapor-Deposition Layer (First Metal Vapor-Deposition Layer)
12B Metal Vapor-Deposition Layer (Second Metal Vapor-Deposition Layer)
12D Metal Vapor-Deposition Layer (Second Metal Vapor-Deposition Layer)
12E Metal Vapor-Deposition Layer (First Metal Vapor-Deposition Layer)
12F Metal Vapor-Deposition Layer (Second Metal Vapor-Deposition Layer)
12G Metal Vapor-Deposition Layer (First Metal Vapor-Deposition Layer)
12H Metal Vapor-Deposition Layer (Third Metal Vapor-Deposition Layer)
18 Oxide Film
20 Metallized Film Capacitor
21A Bus Bar
22 Case
23 Molding Resin
121A Terminal Portion

The invention claimed is:

1. A metallized film capacitor comprising:
a dielectric film;
a first metal vapor-deposition electrode provided on an upper surface of the dielectric film;
a second metal vapor-deposition having an upper surface facing a lower surface of the first metal vapor-deposition electrode across the dielectric film;
a first electrode connected to the first metal vapor-deposition electrode; and
a second electrode connected to the second metal vapor-deposition electrode, wherein
at least one metal vapor-deposition electrode of the first metal vapor-deposition electrode and the second metal vapor-deposition electrode is made of substantially only aluminum and magnesium.

2. The metallized film capacitor according to claim 1, wherein
the at least one metal vapor-deposition electrode is made of an alloy including aluminum and magnesium,
an amount of magnesium in the alloy ranges from 0.5 wt. % by to 15 wt. %,
magnesium is distributed unevenly in the at least one metal vapor-deposition electrode, and
a maximum concentration of magnesium in the at least one of the metal vapor-deposition electrodes is located within a region from an upper surface of the at least one metal vapor-deposition electrode up to a distance of ½ of a thickness of the at least one metal vapor-deposition electrode, or within a region from a lower surface of the at least one metal vapor-deposition electrode up to a distance of ½ of the thickness of the at least one metal vapor-deposition electrode.

3. The metallized film capacitor according to claim 1, wherein the amount of magnesium in the at least one metal vapor-deposition electrode ranges from 0.5 wt. % to 45 wt. %.

4. The metallized film capacitor according to claim 1, wherein the at least one of metal vapor-deposition electrode includes:
a first metal vapor-deposition layer mainly containing aluminum, and
a second metal vapor-deposition layer containing magnesium.

5. The metallized film capacitor according to claim 4, wherein
a lower surface of the first metal vapor-deposition layer constitutes a lower surface of the at least one metal vapor-deposition electrode, and
the second metal vapor-deposition layer is located on an upper surface of the first metal vapor-deposition layer.

6. The metallized film capacitor according to claim 4, wherein
a lower surface of the second metal vapor-deposition layer constitutes a lower surface of the at least one metal vapor-deposition electrode, and
the first metal vapor-deposition layer is located on an upper surface of the second metal vapor-deposition layer.

7. The metallized film capacitor according to claim 6, wherein the at least one metal vapor-deposition electrode further includes a third metal vapor-deposition layer formed on an upper surface of the first metal vapor-deposition layer, the third metal vapor-deposition layer containing magnetism.

8. The metallized film capacitor according to claim 1, wherein
the first electrode is provided on an end of the dielectric film, said metallized film capacitor further comprising a low resistance portion provided on an upper surface of the first metal vapor-deposition electrode at the end of the dielectric film, the low resistance portion being connected to the first electrode, the low resistance portion being made of a conductor.

9. The metallized film capacitor according to claim 1, further comprising an oxide film provided on an upper surface of the at least one metal vapor-deposition electrode.

10. The metallized film capacitor according to claim 1, wherein
the at least one metal vapor-deposition electrode is the first metal vapor-deposition electrode,
the second metal vapor-deposition electrode is made of substantially only aluminum,
the first metal vapor-deposition electrode includes a first non-divided electrode portion that is not divided,
the second metal vapor-deposition electrode includes:
a second non-divided electrode portion that is not divided;
a plurality of divided electrode portions; and
a plurality of fuses that connect the plural divided electrode portions to the second non-divided electrode portion, and the first non-divided electrode portion faces the second non-divided electrode portion and the plurality of divided electrode portions across the dielectric film.

11. The metallized film capacitor according to claim 1, wherein the at least one metal vapor-deposition electrode is the second metal vapor-deposition electrode, the first metal vapor-deposition electrode is made of substantially only aluminum, the second metal vapor-deposition electrode includes a first non-divided electrode portion that is not divided, the first metal vapor-deposition electrode includes:
- a second non-divided electrode portion that is not divided;
- a plurality of divided electrode portions; and
- a plurality of fuses that connect the plural divided electrode portions with the second non-divided electrode portion, and the first non-divided electrode portion faces the second non-divided electrode portion and the plural divided electrode portions across the dielectric film.

12. A case mold type capacitor comprising:

a plurality of metallized film capacitors;

a bus bar that connects the plurality of metallized film capacitors with one another, the bus bar includes a terminal portion;

a case that accommodates the plurality of metallized film capacitors and the bus bar therein; and a molding resin filling the case as to cover the plurality of metallized film capacitors and the bus bar such that the terminal portion of the bus bar is exposed, wherein at least one of the plural metallized film capacitors is the metallized film capacitor according to claim 1.

* * * * *